US008059619B2

(12) United States Patent
Jakobsen et al.

(10) Patent No.: US 8,059,619 B2
(45) Date of Patent: Nov. 15, 2011

(54) MOBILE COMMUNICATION SYSTEM AND A MOBILE STATION, A BASE TRANSCEIVER STATION AND A METHOD FOR USE THEREIN

(75) Inventors: Jens Jakobsen, Malmo (DE); Svend Frandsen, Praestoe (DK); Malcolm Young, Melbourne (AU)

(73) Assignee: Motorola Solutions, Inc., Schaumburg, IL (US)

( * ) Notice: Subject to any disclaimer, the term of this patent is extended or adjusted under 35 U.S.C. 154(b) by 482 days.

(21) Appl. No.: 12/281,980

(22) PCT Filed: Mar. 8, 2007

(86) PCT No.: PCT/US2007/063562
§ 371 (c)(1),
(2), (4) Date: Oct. 6, 2008

(87) PCT Pub. No.: WO2007/104009
PCT Pub. Date: Sep. 13, 2007

(65) Prior Publication Data
US 2009/0067340 A1 Mar. 12, 2009

(30) Foreign Application Priority Data
Mar. 8, 2006 (GB) .................................. 0604601.5

(51) Int. Cl.
*H04B 7/212* (2006.01)
*H04B 17/00* (2006.01)

(52) U.S. Cl. ...................... 370/337; 370/347; 455/67.13; 455/115.1; 455/135
(58) Field of Classification Search .................... None
See application file for complete search history.

(56) References Cited

U.S. PATENT DOCUMENTS

| 6,269,087 | B1* | 7/2001 | Nakamura et al. ............. 370/331 |
| 6,704,557 | B1* | 3/2004 | Krishnamurthy et al. . 455/278.1 |
| 6,785,324 | B1* | 8/2004 | Schultz et al. ................. 375/219 |
| 7,697,885 | B2* | 4/2010 | Stoddard ........................... 455/1 |
| 2003/0224719 | A1* | 12/2003 | Lucidarme et al. ............... 455/1 |
| 2003/0233567 | A1* | 12/2003 | Lynn et al. ..................... 713/200 |
| 2004/0224692 | A1* | 11/2004 | Hamabe ......................... 455/442 |
| 2005/0197124 | A1* | 9/2005 | Kang et al. .................... 455/439 |

FOREIGN PATENT DOCUMENTS

| EP | 1 304 895 A2 | 4/2003 |
| EP | 1 492 249 A1 | 12/2004 |
| EP | 1 501 329 A2 | 1/2005 |

* cited by examiner

*Primary Examiner* — Andrew Lee
(74) *Attorney, Agent, or Firm* — Barbara R. Doutre; Terri S. Hughes; Daniel R. Bestor (57) ABSTRACT

A mobile communication system (100) includes an infrastructure (121) including at least a first base transceiver station (123) and a plurality of mobile stations (101, 103), wherein each of the mobile stations is operable to detect interference by jamming to a signal sent on a downlink channel by the first base transceiver station and, when it determines that such interference exists, to send a notification message to the infrastructure.

19 Claims, 4 Drawing Sheets

MOBILE COMMUNICATION SYSTEM AND A MOBILE STATION, A BASE TRANSCEIVER STATION AND A METHOD FOR USE THEREIN

The present invention relates to a mobile communication system and a mobile station, a base transceiver station, and a method for use in the system. In particular, the invention relates to detection of interference by jamming and consequential operation in a mobile communication system.

BACKGROUND OF THE INVENTION

A mobile communication system is one in which mobile or portable user terminals, such as mobile telephones, portable radios or radios on vehicles, herein collectively referred to as 'mobile stations', or 'MSs' ('MS' in the singular), can communicate via a network infrastructure which generally includes fixed installations including at least one fixed base station, known in the art as a 'base transceiver station' or 'BTS', and usually various sub-systems for management and control of the system including the at least one BTS. The system may for example be a cellular one including a plurality of BTSs wherein each BTS serves MSs in a given region or area known as a 'cell' or 'site' by radio communication. The cells of neighbouring BTSs in such a system are often overlapping.

Signals sent from MSs to their serving BTS in a mobile communication system are known as 'uplink' signals. Signals sent from a BTS to MSs are known as 'downlink' signals. Uplink and downlink signals may be, and usually are, sent on different channels, e.g. with different carrier frequencies.

A mobile communication system, especially a cellular system, may be a trunked system in which radio channels of the system are shared between MSs for different communications, and each channel is assigned for a particular communication for a temporary period only.

Communications of different types in a mobile communication system, originating either at a BTS or at a MS, may be sent on different channels dedicated to the different communication types. For example, the channels employed may include control channels and traffic channels in which communications transmitted comprise respectively control signals and traffic signals. There may be different channels for different traffic types for example communications of voice, short data and packet data information. In a system operating according to a TDMA (Time Division Multiple Access) protocol, the different channels may be provided by different specified time slots or frames of slots of a single RF carrier, the different time slots or frames of slots being provided within a timing structure used by all terminals of the system.

Users of MSs generally require a high grade of service and reliable connectivity whilst using the system for various services such as telephony calls, dispatch calls and data transfers, especially more advanced data transfers such as transmission of picture or video images.

Generally, in a cellular system, it is desirable therefore for the MSs to be served by a selected BTS which can provide good radio signals to and from the MS. Since MSs can move from one region to another it is known for the MSs to monitor signals from different BTSs, in order to operate a procedure to determine whether it would be worthwhile, in order to receive better service, to switch from a current serving BTS to another one and if appropriate to carry out such a switch. In the art, the procedure to monitor for and to make determinations regarding such a possible switch is known as a 'cell re-selection' procedure. This usually operates in two stages, namely (i) a first stage in which the mobile station draws up a list of candidate non-serving BTSs to which it could potentially switch to as its serving BTS, including a preferred non-serving BTS which is selected to be top of the list; and (ii) a second stage in which measurements are carried out comparing signals from the preferred non-serving BTS with those from the current serving BTS and determining whether certain criteria are met which require a switch to the preferred BTS to be made. Where such criteria are met, a procedure known as 'handover' or 'handoff' is carried out to effect such a switch so that the MS becomes served by the preferred BTS.

Any wireless link is a potential target for interference generated either accidentally or intentionally (e.g. by a hostile activity). The risk of accidental interference may be increased by the coexistence of different systems or devices in the same area sharing the same (or a close) frequency. Moreover, in a cellular communication system, accidental interference can be caused by an inappropriate frequency re-use strategy or by unusual propagation conditions. Accidental interference can however be eliminated by careful planning and design of the system.

Interference by jamming causes a greater problem, since when this occurs all communications on the channel or channels being jammed may become unintelligible noise rather than useful signals. The channels providing the more sensitive communication links, i.e. those which are more attractive to for a would be hostile party to jam, are the downlink channels, particularly the downlink control channel. Every service to MSs provided by the infrastructure is established using information exchange on the downlink channels from the serving BTS. In the event that a downlink control channel is blocked by interference due to jamming, no service can be provided. The risk of jamming of the downlink channels is increased because the transmission by a BTS on its downlink channels, usually on a given carrier frequency, is substantially continuous and therefore can be easily detected and analysed by receiving devices being used in a hostile jamming activity. In contrast, on the uplink channel, there is in general no continuous transmission; transmission is performed by MSs only when a service is being been used or being requested for use by an MS.

EP-A-1304895 describes a known method of detecting interference by jamming to a signal sent by a downlink channel. A polling signal is sent by a BTS to MSs. The MSs automatically send response messages to the BTS if they receive the polling signal. A condition of interference by jamming is deemed to exist if no response messages are received by the BTS, indicating that the MSs did not satisfactorily receive the polling signal.

SUMMARY OF THE INVENTION

According to the present invention in a first aspect there is provided a mobile communication system as defined in claim 1 of the accompanying claims.

According to the present invention in a second aspect there is provided a mobile station as defined in claim 17 of the accompanying claims.

According to the present invention in a third aspect there is provided a base transceiver station as defined in claim 19 of the accompanying claims.

According to the present invention in a fourth aspect there is provided a method as defined in claim 21 of the accompanying claims.

Further features of the invention are as defined in the accompanying dependent claims or are disclosed in the embodiments of the invention described later in this description.

Embodiments of the present invention will now be described by way of example with reference to the accompanying drawings, in which:

DESCRIPTION OF EMBODIMENTS OF THE INVENTION

Figure 1:
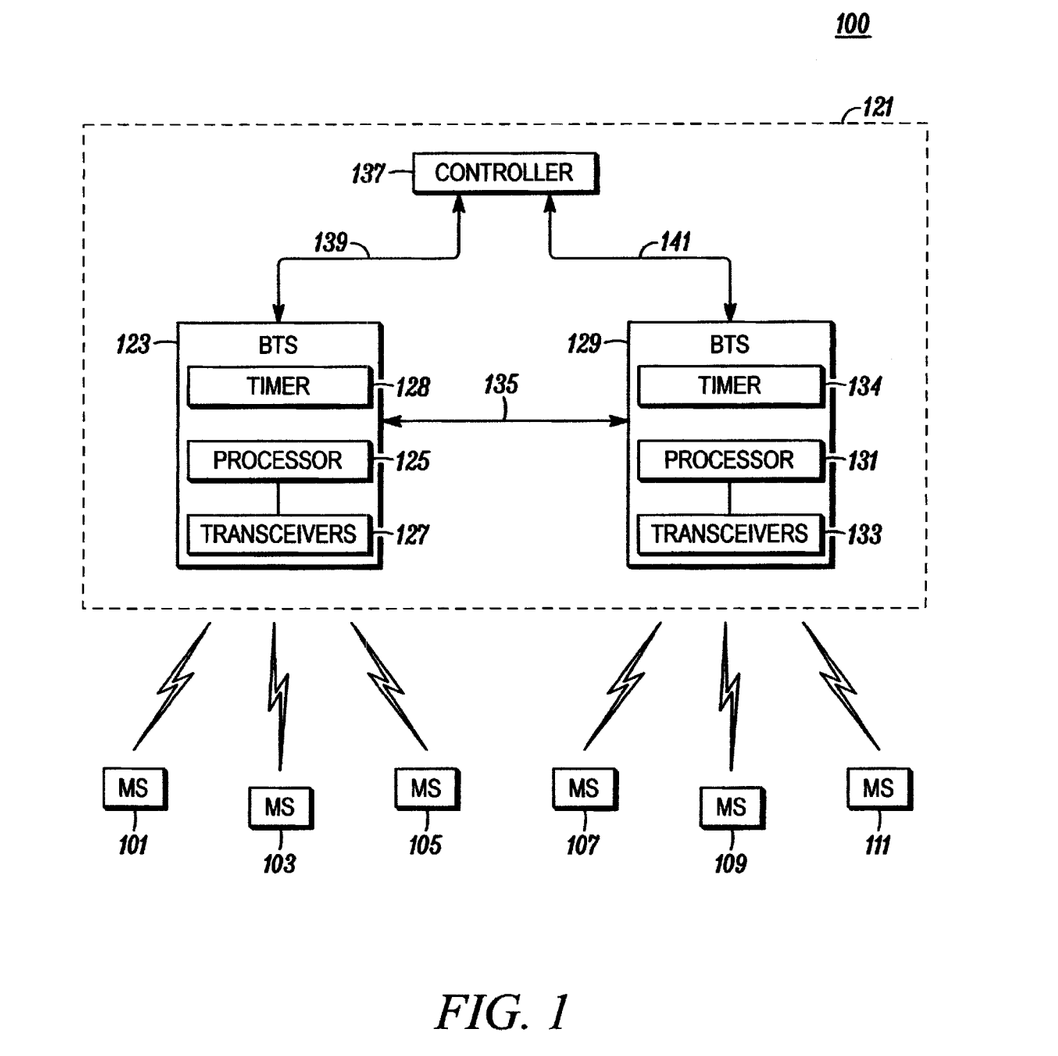
FIG. 1 is a block schematic diagram of an illustrative mobile communication system embodying the invention.

FIG. 1 is a block schematic diagram of an illustrative mobile communication system 100 embodying the present invention. The system 100 includes a plurality of MSs, six of which are shown, namely MSs 101, 103, 105, 107, 109 and 111, and a fixed infrastructure 121. The infrastructure 121 includes a plurality of BTSs, two of which are shown, namely a BTS 123 and a neighbouring BTS 129. The BTSs 123 and 129 are operably connected together by a link 135. The BTSs 123 and 129 are also operably connected by links 139 and 141 respectively to a controller 137. The links 135, 139 and 141 may be known wired or wireless links depending on the particular implementation of the system 100.

The controller 137 provides management control of the BTSs of the system 100, including the BTS 123 and the BTS 129, and of other infrastructure functional units (not shown) of the system 100. The controller 137 may take one of a number of possible forms. It may be a separate unit or it may be integrated with other functional units such as MS mobility databases. For example, the controller 137 may comprise or may be incorporated in a zone controller, which controls operations in a geographical zone of the system 100.

The BTS 123 includes as basic operating component units (together with other component units not shown) a processor 125 which carries out signal processing and controlling functions within the BTS 123, a timer 128 which controls timing of operations in the BTS 123 and transceivers 127 which send and receive radio communication signals to MSs served by the BTS 123. The MSs 101, 103 and 105 are nearer to the BTS 123 than to the BTS 129 (and other BTSs not shown) and are currently served by the BTS 123.

The BTS 125 similarly includes as basic operating component units (together with other component units not shown) a processor 131 which carries out signal processing and controlling functions within the BTS 125, a timer 134 which controls timing of operations in the BTS 129 and transceivers 133 which send and receive radio communication signals to MSs served by the BTS 129. The MSs 107, 109 and 111 are nearer to the BTS 129 than to the BTS 123 (and other BTSs not shown) and are currently served by the BTS 129.

Figure 2:
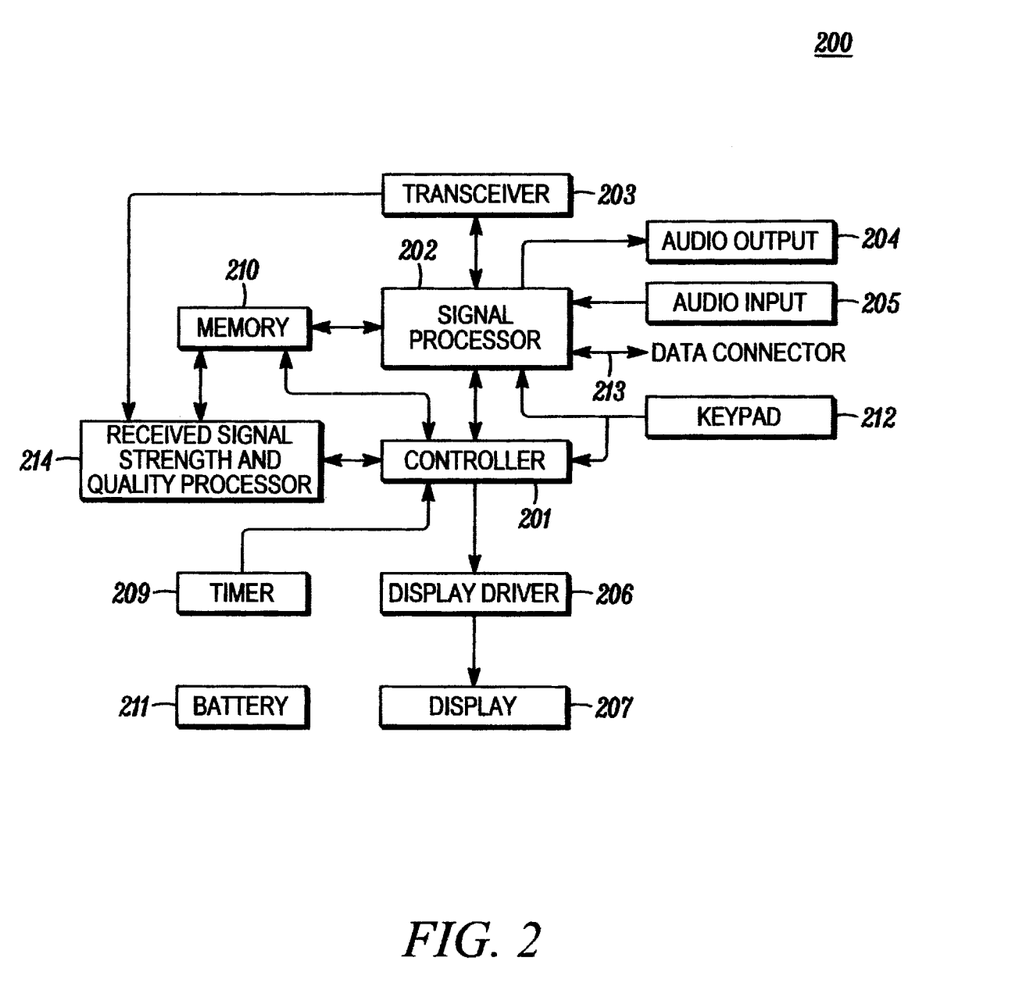
FIG. 2 is a block schematic diagram of an illustrative arrangement of functional components in a mobile station in the system of FIG. 1.

FIG. 2 is a block schematic diagram showing more detail of an illustrative form 200 of the MS 101. The MSs 103 to 111 may be constructed and operate in a similar manner. The operational functions of the MS 101 in the form 200 are controlled by a controller 201 which operates in conjunction with a timer 209 which synchronises operations within the form 200 of the MS 101 and a memory 210 which stores data and programs used within the form 200 of the MS 101. A signal processor 202 processes information included in RF signals sent and received by a transceiver 203. The signal processor 202 extracts information from a received RF signal detected by the transceiver 203 and passes the information to an appropriate output transducer. Similarly, the signal processor 202 receives input information for transmission from an appropriate input transducer and delivers the information to the transceiver 203 for transmission in the form of an RF signal by the transceiver 203. The form 200 of the MS 101 includes an audio output 204 which is an output transducer, e.g. a speaker, which converts signals received which represent speech information to an output audible form for delivery to a user. The form 200 of the MS 101 also includes an audio input 205 which is an input transducer, e.g. a microphone, which converts an input audio signal, e.g. in the form of speech, into an electrical form in a well known manner. The electrical signal is delivered to the signal processor 202 described above.

A data connector 213 provides an output for data received in an RF signal at the transceiver 203 and extracted by the signal processor 202. The data connector 213 also provides an input for delivery of data to the signal processor 202 for sending as an RF transmission by the transceiver 203. The data connector 213 may comprise a connection, e.g. a USB data connection, to one or more peripheral devices (not shown), e.g. a computing device running a data processing application. A keypad 212 serves as a user interface and allows a user to enter control signals for delivery to the controller 201 to operate functions of the form 200 of the MS 101. The keypad 212 also acts as another input transducer allowing entry of alphanumeric data for delivery to the signal processor 202 for processing to send in short data radio communications by the transceiver 203. A display 207 operated by a display driver 206 under control of the controller 201 provides displayed information to a user of the MS 101 in a known manner.

A received signal strength and quality processor 214 measures in a known manner a RSSI (received signal strength indication) of a signal received by the transceiver 203 and also measures a quality, e.g. by measuring a BER (bit error rate) or a frame error rate (FER), of the received signal in a known manner. The processor 214 may process data using the measured RSSI and quality in a manner described later with reference to FIG. 3.

A battery 211 provides electrical power to all operational components of the form 200 of the MS 101. The transceiver 203 provides RF communications to and from the transceivers of other terminals operating within the system 100, particularly a transceiver (one of the transceivers 127) of the BTS 123 serving the MS 101. The transceiver 203 can also receive signals from other BTSs for use in a known cell re-selection procedure as referred to earlier. The transceiver 203 can also provide RF communications directly to and from any one or more of the MSs 103 to 111 if the MSs 101 to 111 are able to communicate in a direct mode without the infrastructure 121.

Figure 3:
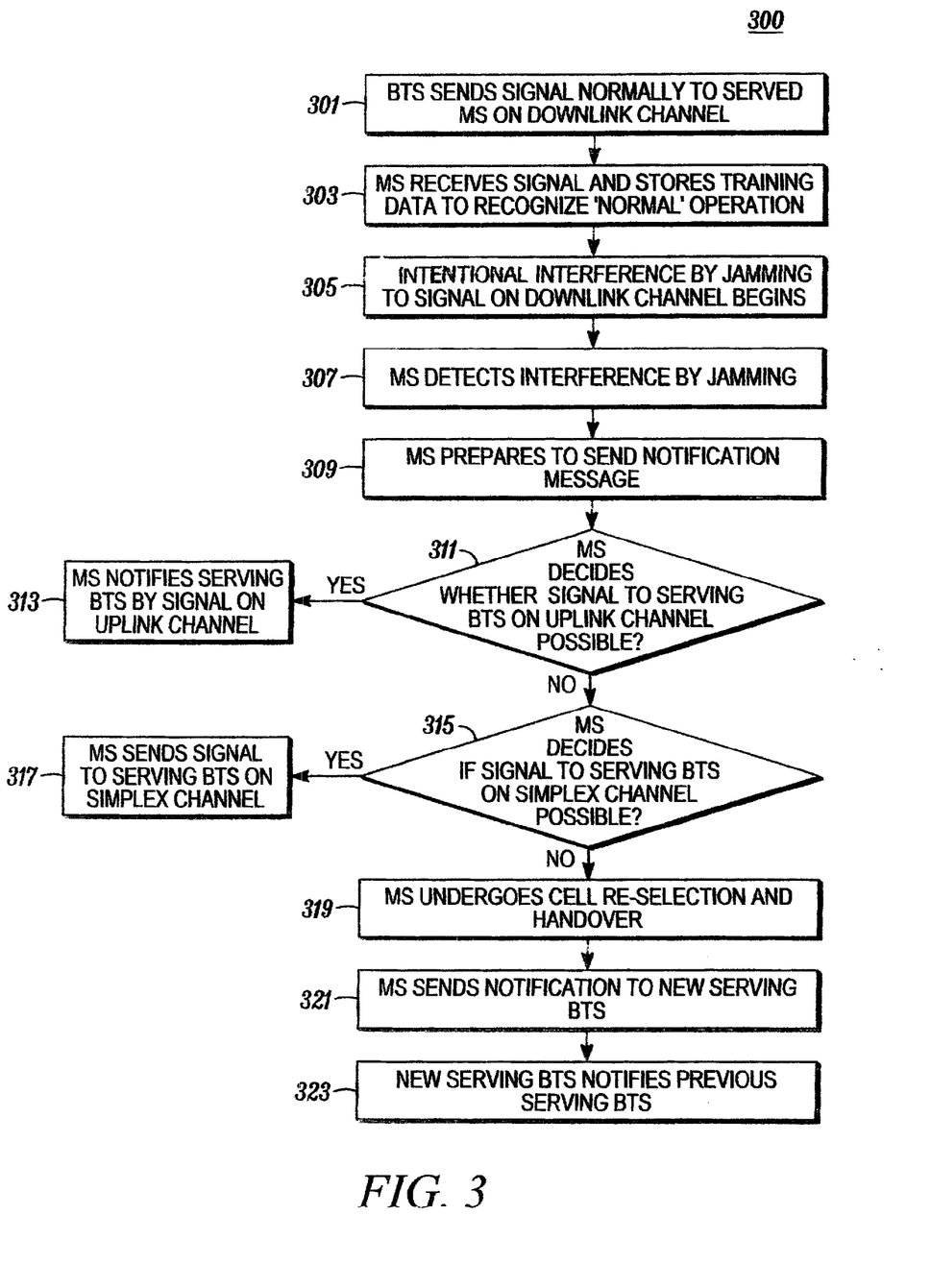
FIG. 3 is a flow chart of an illustrative method of operation embodying the invention in the system of FIG. 1.

FIG. 3 is a flow chart of a method 300 of operation embodying the invention in the system 100. As represented by a step 301, the BTS 123 sends a signal normally to the MS 101 on a downlink channel, which is one of a pair of channels assigned by the controller 137 for the operational use by one of the transceivers 127 of the BTS 123. The other channel of the pair is an uplink channel for use by the MS 101 to send a signal normally to the particular one of the transceivers 127. In a step 303, the MS 101 receives the signal sent by the BTS 123 and may store in its memory 210 (in the form 200) training data relating to the received signals to characterise normal operation. In a step 305, intentional interference by jamming (from a jamming source not shown) begins to be applied to the signals sent on the downlink channel from the BTS 123 to the MS 101. In a step 307, the MS 101 detects interference by jamming to the signal from the BTS 123. The method used by the MS 101 to detect jamming may be a known method. Several such methods are known in the art. For example, the MS 101 in the form 200 may correlate in the processor 214 data relating to the RSSI (received signal strength indication) and the quality, e.g. as measured by BER (bit error rate), of the received signal. If the RSSI is higher than a pre-defined threshold and the quality is also lower (i.e. the BER is higher) than a pre-defined threshold, then the processor 214 may determine that interference by jamming is detected. The thresholds employed in this correlation may have been established using the training data stored in step 303. In a step 309, the MS 101 prepares to send a notification message to the infrastructure 121 to inform the infrastructure 121 that the MS 101 has detected interference by jamming of the signal sent on the downlink channel from the BTS 123. The identity of the BTS 123 and/or the relevant downlink channel(s) may be specified in detail in the notification message. The notification message may be prepared by the signal processor 202 under instruction from the controller 201 in the form 200 of the MS 101.

In a decision step 311, the MS 101 decides whether it is possible to send to its serving BTS, i.e. the BTS 123, on its uplink channel a signal, including the notification message, which will be received by the BTS 123. If the MS 101 decides in step 311 that such a signal on the uplink channel is possible, i.e. the result of the decision in step 311 is 'YES', the MS 101 sends the signal including the notification message to the BTS 123 on the uplink channel in a step 313. If the MS 101 decides in step 311 that a signal on the uplink channel to reach the BTS 123 is not possible owing to jamming, i.e. the result of the decision in step 311 is 'NO', the MS seeks an alternative way of sending the message. In a further decision step 315, the MS 101 determines whether it is possible to send a signal to its serving BTS, i.e. the BTS 123, on a simplex communication channel. Such a channel may be used in the system 100 for example to provide random access to a particular channel such as a packet data channel of the BTS 123. If the MS 101 decides in the decision step 315 that a signal on a simplex channel is possible, i.e. a 'YES' decision, the MS 101 sends such a signal including the notification message on a simplex channel in a step 317. If the MS 101 decides in decision step 315 that a signal on a simplex channel is not possible, i.e. a 'NO' decision, a step 319 follows. Step 319 (and subsequent steps) may follow even if step 313 and/or step 317 have already taken place to serve as a backup notification procedure.

In step 319, the MS 101 undergoes a cell re-selection and handover procedure in a manner known in the art. The procedure is triggered automatically by the MS 101 detecting that the BTS 123 is no longer a serving BTS. Assuming that the result of the cell re-selection and handover procedure is that the BTS 129 becomes a new serving BTS of the MS 101, the MS 101 sends a signal on its uplink channel to the BTS 129 in a step 321. Finally, in a step 323 the new serving BTS 129 relays the notification message to the BTS 123 whose downlink channel signal has been detected as subject to interference by jamming. The notification message is sent via the link 135.

Thus, the result of the method 300 is receipt by the BTS 123 in one or more of steps 313, 317 and 323 of a notification message sent by the MS 101 indicating that the MS 101 has detected interference by jamming to a signal sent by the BTS 123 on a downlink channel to the MS 101. The notification message received may comprise a message in a standard format employed within the system 101 and may be understood by the processor 125 of the BTS 123. For example, the notification message may comprise a standard PDU (protocol data units) message in which only the identity of the MS 101 and the identity of the channel(s) detected to be subject to interference by jamming are variable data fields.

Steps similar to steps 307 to 321 may be applied in other MSs served by the BTS 123, such as the MS 103 and 105. Thus the BTS 123 may receive notification messages concerning the detected interference by jamming from a plurality of MSs served by the BTS 123 by the method 300.

Figure 4:
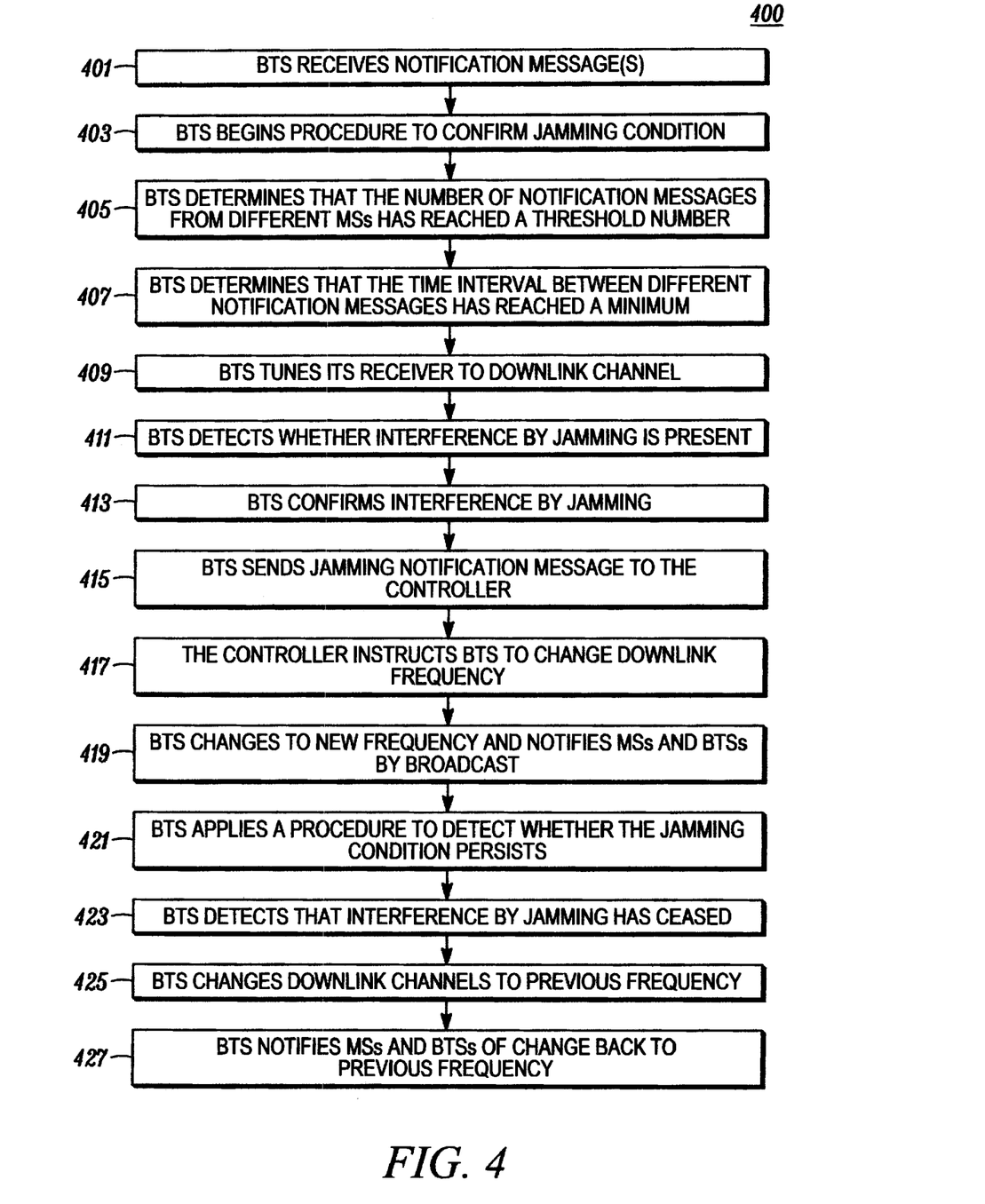
FIG. 4 is a flow chart of an illustrative further method of operation embodying the invention in the system of FIG. 1.

FIG. 4 is a flow chart of a further method 400 embodying the invention. The method 400 is operated by the BTS 123 when it receives (by the method 300) one or more notification messages notifying of interference by jamming to a signal sent on a downlink channel by the BTS 123. The further method 400 begins in a step 401 in which the BTS 123 receives a notification message that a signal sent on a downlink channel by the BTS 123 has been subject to interference by jamming. In a step 403, which follows in response to step 401, the BTS 123 begins a procedure (algorithm) to confirm that a jamming condition exists in respect of a signal the BTS 123 sends on a downlink channel, i.e. that the signal is subject to the interference by jamming which has been reported. This procedure may be operated by the processor 125 of the BTS 123. In a step 405, the BTS 123 determines that a number of notification messages received from different MSs has reached a pre-determined threshold or minimum number. In a step 407, the BTS determines that a time interval between different notification messages has reached a minimum time interval. The step 407 is applied, e.g. using the timer 128, to avoid a spurious interference blip not due to jamming being incorrectly confirmed as jamming. When a positive determination is made in either step 405 or step 407, preferably a combination of the two, a step 409 follows. In the step 409, the BTS 123 tunes a receiver of its transceivers 127 to the downlink channel which has been notified as being subject to interference by jamming. The BTS 123, e.g. the processor 125, then applies a step 411 in which the BTS 123 operates a procedure to detect whether interference by jamming of its signal on a downlink channel by its own receiver is present. This may be a detection procedure similar to the detection procedure operated by the MSs including the MS 101 in the method 300 and/or it may be a different detection procedure. Step 413 following step 411 represents an indication by the detection procedure that interference by jamming on the downlink channel is confirmed. In response to step 413, a step 415 follows in which the BTS 123 sends a jamming notification message to the controller 137 via the link 139. The jamming notification message notifies the controller 137 of the jamming condition. In response to receiving the jamming notification message sent in step 415, the controller 137 instructs the BTS 123 in a step 417 to change the transmission frequency (carrier frequency) of its downlink channel(s) subject to interference by jamming to another frequency. The controller 137 knows the distribution of the transmission frequencies used in the system 100 and is able to determine and specify another frequency which is suitable for use for downlink channel(s) for the BTS 123.

In a step 419, the BTS 123 changes its affected downlink channel(s) to the new transmission frequency notified by the controller 137 in step 417 and the BTS 123 sends a broadcast signal to notify MSs and other BTSs of the new frequency.

This allows MSs that applied a cell re-selection and handover procedure when the interference by jamming was detected to apply, if appropriate, a further cell re-selection and handover procedure to return service back to the BTS 123.

The BTS 123 may periodically apply a procedure to detect whether the jamming condition, i.e. interference by jamming of the signal sent by the BTS 123 on the original downlink channel frequency, persists. This is represented by a step 421. Such a procedure may be instructed by the controller 137 or may be operated automatically by the BTS 123 at pre-determined intervals indicated by the timer 128 of the BTS 123. The BTS 123 may detect in a step 423 that the previously detected interference by jamming has ceased. In an optional step 425, in response to step 423, the BTS 123 may change the transmission frequency of its downlink channel(s) back to the previous frequency which was subject to the interference by jamming. The change in step 425 may be made automatically by the BTS 123 or may be instructed by the controller 137. Finally, following step 425, a step 427 is applied in which the BTS 123 sends a broadcast signal to notify MSs and other BTSs of the change back to the previous transmission frequency for its downlink channel(s).

Operation of the method 300 allows interference by jamming to a signal sent on a downlink channel of the BTS 123 to be detected by MSs such as the MSs 101 to 105 and reported to the BTS 123. Operation of the method 400 allows the BTS 123 to confirm the reported interference by jamming condition and to change its downlink channels to another frequency, preferably after notification to and instruction by the controller 137. The BTS 123 does not have to send out frequent polling test signals to MSs to see if responses are sent from the test signals as in the procedure described in EP-A-1304895. Beneficially, this saves valuable processing resources in the BTS 123. Furthermore, unlike the method of EP-A-1304895, the BTS 123 does not need to know which MSs are active at any one time, although the method 300 assumes that statistically at least a proportion of the MSs served by the affected BTS, the BTS 123, will be active and will detect a condition in which there is interference by jamming. Furthermore, the method 300 includes the MSs determining one or more appropriate ways of sending a notification message to the infrastructure 121, particularly the BTS 123, about the detected interference by jamming condition. This ensures that such messages reach their target destination in the infrastructure 121. In contrast, the MSs in the method of EP-A-1304895 do not make intelligent decisions about how to send response messages.

The methods 300 and 400 may be applied in a variety of mobile communication systems in which interference by jamming to a downlink signal sent by a base transceiver station is possible. For example, the methods 300 and 400 may be employed in cellular systems such as those operating in accordance with the GSM standard or the TETRA standard defined by ETSI (the European Telecommunications Standards Institute) or the APCO 25 standard defined by the Association of Public-Safety Communications Officials International Inc.

The invention claimed is:

1. A mobile communication system including an infrastructure having at least a first base transceiver station configured to:
   transmit signals to a plurality of mobile stations via a downlink,
   receive one or more jamming notification messages from one or more of the plurality of mobile stations reporting that a signal sent by the first base transceiver station on the downlink has been subject to interference by jamming, and
   responsive to receiving the one or more jamming notification messages but prior to taking any steps to avoid the reported interference, to execute a separate confirmation process to confirm that the reported interference by jamming exists on the downlink.

2. The system according to claim 1 wherein the first base transceiver station is further configured to receive at least one of the one or more jamming notification messages directly from a corresponding one of the plurality of mobile stations via an uplink channel.

3. The system according to claim 1 wherein the first base transceiver station is further configured to receive at least one of the one or more jamming notification messages directly from a corresponding one of the plurality of mobile stations via a simplex channel.

4. The system according to claim 1 wherein the first base transceiver station is further configured to receive a plurality of jamming notification messages directly from corresponding ones of the plurality of mobile stations via random access channels.

5. The system according to claim 1, wherein the first base transceiver station is further configured to receive at least one of the one or more jamming notification messages indirectly from a corresponding one of the plurality of mobile stations via a link with a second base transceiver station.

6. The system according to claim 5 wherein of the at least one of the one or more jamming notification messages received by the first base transceiver station indirectly via the second base transceiver station is a result of the corresponding one of the plurality of mobile stations applying a cell re-selection procedure and a handover procedure to be served by the second base transceiver station prior to sending the at least one of the one or more jamming notification messages to the first base transceiver station via the second base transceiver station.

7. The system according to claim 6 wherein the second base transceiver station forwards the at least one of the one or more jamming notification messages to the first base transceiver station.

8. The system according to claim 1 wherein the confirmation process comprises determining that a minimum threshold number of jamming notification messages have been received from different mobile stations out of the plurality of mobile stations.

9. The system according to claim 1 wherein the confirmation process comprises determining that a plurality of jamming notification messages have been received from different mobile stations out of the plurality of mobile stations over a minimum interval period of time.

10. The system according to claim 1, wherein the confirmation process comprises the first base transceiver station tuning a receiver to a downlink channel reported to be subject to interference by jamming, and determining whether a jamming signal is detected on the downlink channel.

11. The system according to claim 1 wherein the first base transceiver station is further configured, responsive to confirming that a jamming condition exists on the downlink, to report the confirmed jamming condition to a controller included within the infrastructure.

12. The system according to claim 1 wherein the first base transceiver station is further configured to change a downlink transmission frequency in response to confirming that a jamming condition exists on the downlink.

13. The system according to claim 11 wherein the first base transceiver station is further configured to change its downlink transmission frequency in response to receiving an instruction from the controller to change its downlink transmission frequency.

14. A method of detecting jamming of a downlink at a base transceiver station, the method comprising:
the base transceiver station transmitting signals to a plurality of mobile stations via the downlink,
the base transceiver station receiving one or more jamming notification messages from one or more of the plurality of mobile stations that a signal sent by the first base transceiver station on the downlink has been subject to interference by jamming, and
responsive to receiving the one or more jamming notification messages, but prior to taking any steps to avoid the reported interference, the base transceiver station executing a confirmation process to confirm that a jamming condition exists on the downlink.

15. The method of claim 14, wherein the confirmation process comprises the base transceiver station determining that a minimum threshold number of jamming notification messages have been received from different mobile stations.

16. The method of claim 14, wherein the confirmation process comprises the base transceiver station determining that a plurality of jamming notification messages have been received from different mobile stations over a minimum interval of time.

17. The method of claim 14, wherein the confirmation process comprises the base transceiver station tuning a receiver to a downlink channel reported to be subject to interference by jamming, and determining whether a jamming signal is detected on the downlink channel.

18. A mobile station for communicating with an infrastructure including at least one base transceiver station, the mobile station configured to:
receive signals from the base transceiver station via a downlink;
detect possible interference by jamming on the downlink;
generate a notification message for transmission to the first base transceiver station reporting the detected possible interference by jamming on the downlink; and
determine whether one of an uplink channel and a simplex channel is available to directly send the generated notification message to the first base transceiver station, and if so, transmit the generated notification message to the first base transceiver station via the one of the uplink channel and the simplex channel.

19. The mobile station of claim 18, further configured to:
select and handover service to a second base transceiver station different from the first base transceiver station; and
send the generated notification message to the first base transceiver station via the second base transceiver station.

* * * * *

UNITED STATES PATENT AND TRADEMARK OFFICE
CERTIFICATE OF CORRECTION

| | | |
|---|---|---|
| PATENT NO. | : 8,059,619 B2 | Page 1 of 1 |
| APPLICATION NO. | : 12/281980 | |
| DATED | : November 15, 2011 | |
| INVENTOR(S) | : Jakobsen et al. | |

It is certified that error appears in the above-identified patent and that said Letters Patent is hereby corrected as shown below:

On the Title Page, Item (75), under "Inventors", Line 1, delete "Malmo (DE);" and insert -- Malmo (DK); --, therefor.

In Column 8, Line 30, in Claim 6, delete "wherein of the" and insert -- wherein the --, therefor.

Signed and Sealed this
Eleventh Day of December, 2012

David J. Kappos
*Director of the United States Patent and Trademark Office*